(12) United States Patent  (10) Patent No.: US 7,249,508 B2
Rogalla et al.  (45) Date of Patent: Jul. 31, 2007

(54) DEVICE AND METHOD FOR FASTENING BALANCING WEIGHTS TO ROTORS, IN PARTICULAR TO PROPELLER SHAFTS OR CARDAN SHAFTS

(75) Inventors: Martin Rogalla, Darmstadt (DE); Frank Hillringhaus, Seeheim (DE)

(73) Assignee: Schenck RoTec GmbH, Darmstadt (DE)

( * ) Notice: Subject to any disclaimer, the term of this patent is extended or adjusted under 35 U.S.C. 154(b) by 86 days.

(21) Appl. No.: 10/520,390

(22) PCT Filed: Jul. 1, 2003

(86) PCT No.: PCT/DE03/02180

§ 371 (c)(1),
(2), (4) Date: Jun. 15, 2005

(87) PCT Pub. No.: WO2004/005878

PCT Pub. Date: Jan. 15, 2004

(65) Prior Publication Data

US 2005/0252349 A1    Nov. 17, 2005

(30) Foreign Application Priority Data

Jul. 4, 2002   (DE) ............................... 102 30 207

(51) Int. Cl.
*G01M 1/02* (2006.01)
*G01M 1/38* (2006.01)
(52) U.S. Cl. .......................................... 73/468; 73/487
(58) Field of Classification Search .......... 73/457–460, 73/462, 468–470, 471–479, 487
See application file for complete search history.

(56) References Cited

U.S. PATENT DOCUMENTS

| 4,803,882 | A |   | 2/1989  | Schonfeld et al. |
|-----------|---|---|---------|------------------|
| 5,827,964 | A | * | 10/1998 | Douine et al. ................ 73/466 |
| 5,992,232 | A | * | 11/1999 | Saitoh ........................ 73/468 |
| 6,539,852 | B2 |  | 4/2003  | Ertl |

FOREIGN PATENT DOCUMENTS

| DE | 1 573 678  | 2/1971  |
| DE | 1 573 763  | 3/1971  |
| DE | 30 11 824  | 10/1981 |
| DE | 36 38 158  | 5/1988  |
| DE | 44 40 812  | 5/1996  |
| EP | 1 124 123  | 8/2001  |
| JP | 56-012529  | 2/1981  |
| JP | 57-023834  | 2/1982  |
| JP | 61-209780  | 9/1986  |
| JP | 06-241936  | 9/1994  |

\* cited by examiner

*Primary Examiner*—Helen Kwok
(74) *Attorney, Agent, or Firm*—W. F. Fasse; W. G. Fasse

(57) ABSTRACT

In a device (3) for fastening balancing weights to rotors (2) with a plurality of compensation planes, in particular to propeller shafts or Cardan shafts, preferably in a balancing machine (1) that includes at least one gripper-like device which can be positioned along the rotor axis, and with which a balancing weight is placed on the external periphery of the rotor (2) and can be fastened there, the gripper-like device (5) includes plural receivers for receiving a plurality of the balancing weights.

16 Claims, 2 Drawing Sheets

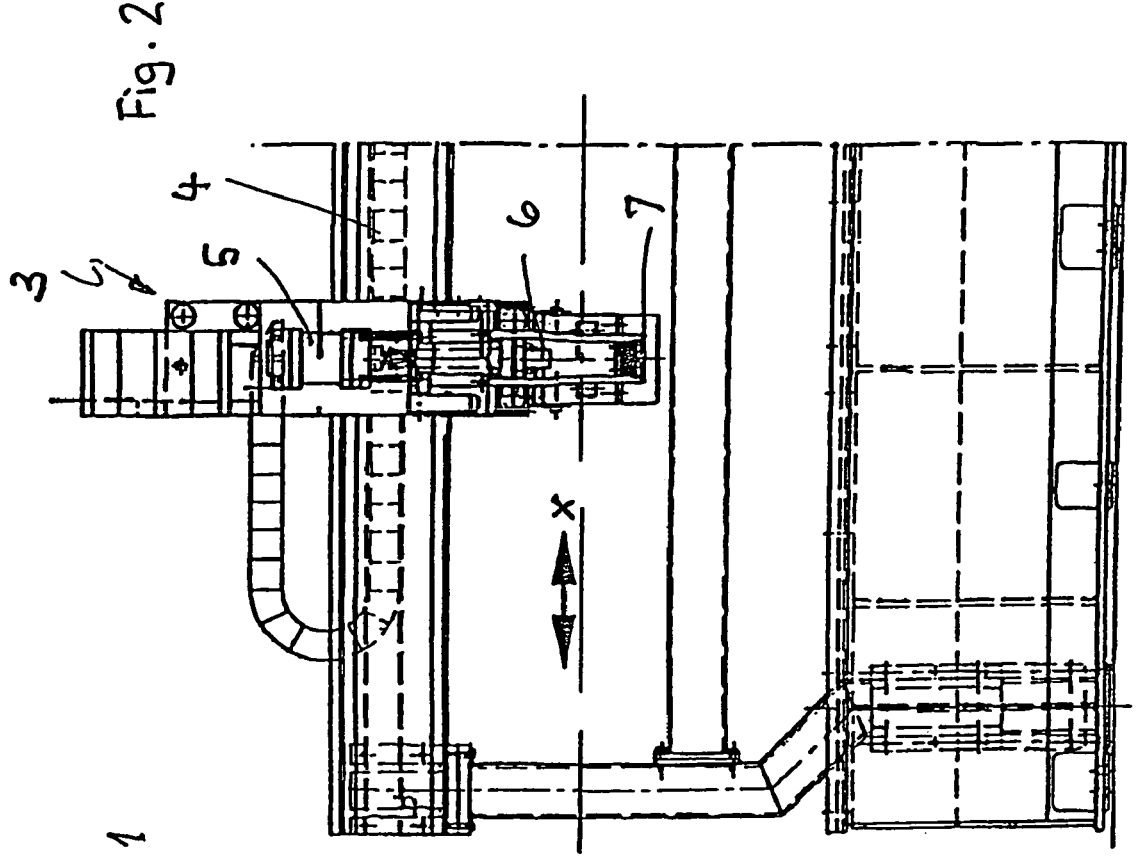
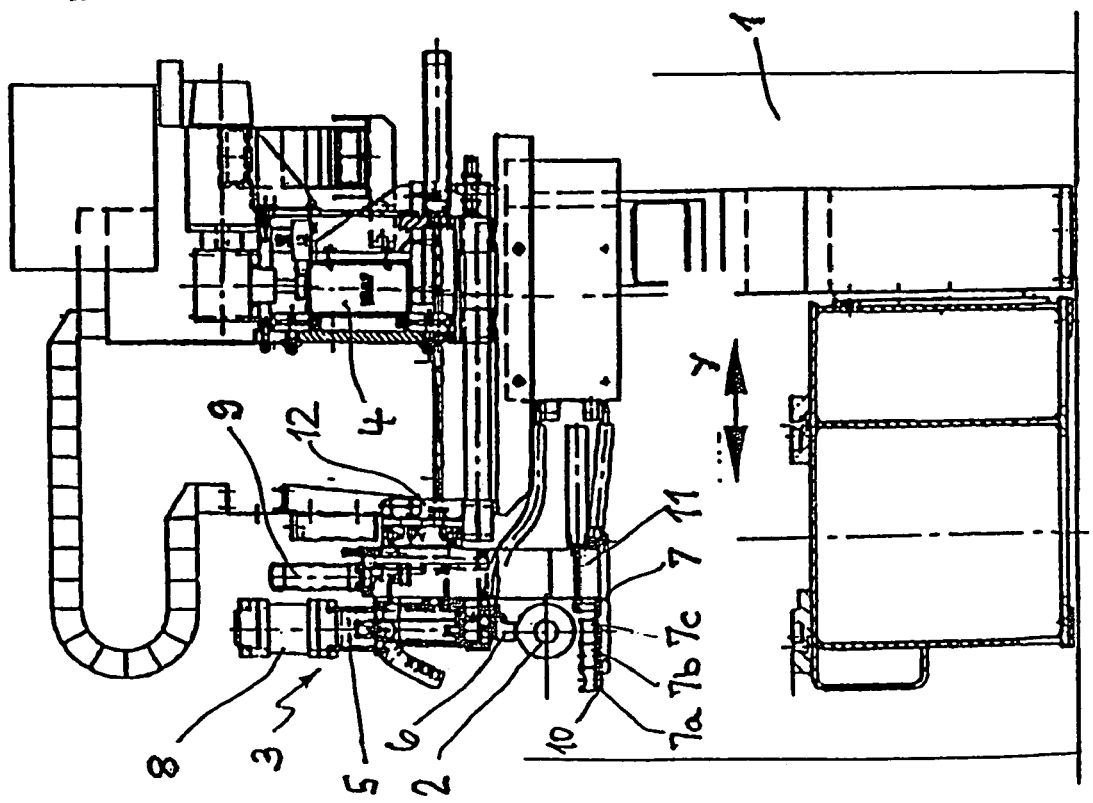

DEVICE AND METHOD FOR FASTENING BALANCING WEIGHTS TO ROTORS, IN PARTICULAR TO PROPELLER SHAFTS OR CARDAN SHAFTS

FIELD OF THE INVENTION

The invention relates to a device for fastening balancing weights to rotors comprising a plurality of compensation planes, in particular to propeller shafts or cardan shafts, preferably in a balancing machine which comprises at least one gripper-like device which can be positioned along the rotor axis, with which device a balancing weight can be placed on the outer periphery of the rotor and fastened there, and to a method for fastening balancing weights to rotors by means of the gripper-like device.

BACKGROUND INFORMATION

Devices and methods of the type mentioned at the outset are used in series production to economically balance relatively large unit numbers of rotors which comprise a plurality of compensation planes, for example propeller shafts or cardan shafts.

It is known from DE 44 40 812 A1 to arrange a rotor, for example a cardan shaft, in a balancing machine, to ascertain the imbalance in terms of size and angular position and to then place balancing weights in the compensation planes of the cardan shaft on the periphery of the rotor by means of at least one gripper-like device associated with the balancing machine, and to fasten them. For this purpose, the balancing weight is received by a unit of the gripper-like device, which gripper-like device is brought into the compensation position and the rotor rotated into the correct angular position. The balancing weight is then fastened, for example, by means of a gluing or welding operation. A gripper-like device is provided in each compensation plane for compensating imbalances in a plurality of compensation planes. Instead of this, a gripper-like device displaceable only along the rotor axis may be provided which is displaced into the relevant compensation plane in each case. Irrespective of whether one or more gripper-like devices are provided, there is expensive equipping of the gripper-like device with a balancing weight which is required at this balancing point for each balancing step.

SUMMARY OF THE INVENTION

The object of the invention is to allow a simple and inexpensive application of the requisite balancing weights in a device and a method of the type mentioned at the outset.

The object is achieved according to the invention in that, in a device of the type mentioned at the outset, the gripper-like or pliers-like device is constructed to receive a plurality of balancing weights. For fastening by means of the gripper-like device, a plurality of balancing weights is moved transversely to the longitudinal direction of the rotor and a selected balancing weight is placed and fastened on the periphery of the rotor.

Fully automatic compensation of imbalances is easily possible with the invention, wherein all balancing weights for complete compensation of imbalances of a rotor are fastened to the rotor by means of just one gripper-like device, without intermediate provision of balancing weights being necessary. This also includes a second supplementary imbalance compensation step which may possibly be necessary and which takes place in a compensation plane of the rotor closely adjacent in the longitudinal direction thereof.

The gripper-like device can advantageously be equipped with balancing weights at just one suitable loading station. This can take place by means of an automatic equipping device or else via the operator. The frequency and/or the duration of the equipping operation is reduced, so, for example, two balancing machines for propeller shafts or cardan shafts can be serviced by just one operator in quick succession. This applies in particular when only a single loading station is provided for equipping a plurality of balancing machines and this is ergonomically advantageously located, for example, between the balancing machines or is arranged at the ends thereof. Production costs are lower as a result of the lower complexity owing to only one gripper-like device and the simplification of equipping with balancing weights.

Advantageous in design is a configuration of the invention in which, in a gripper-like fastening device with two gripper units, preferably the lower unit comprises a receiver part, which can be displaced with respect to the unit and transversely to the longitudinal direction of the rotor, for receiving a plurality of balancing weights, as in this case conventional carriage solutions can be used and only small inertia masses have to be moved. By using the lower gripper unit a holding device for the received balancing weights can generally be dispensed with.

An embodiment of the invention in which the two gripper units can be jointly displaced along the rotor axis is very simple in construction.

In an embodiment of the invention wherein the receiver part comprises receivers for balancing weights which are arranged in the manner of a matrix transversely to the longitudinal direction of the rotor and in the longitudinal direction of the rotor, it is possible to keep in stock different forms of balancing weight or different balancing weight materials, for example sheet steel or strips of sheet aluminium for welding-on. Rotors which are different in terms of form or material may also be balanced in mixed operation. The application, in other words the placing and subsequent fastening of the balancing weights, is further simplified by a configuration in which the receiver part and the other gripper unit are displaceable relative to each other in the longitudinal direction of the rotor and both can preferably be jointly displaced transversely to the longitudinal direction of the rotor as the receiver with the selected balancing weight and the counter element can thus be quickly arranged opposite each other on the other gripper unit.

A further advantageous configuration of the invention provides that preferably the lower gripper unit comprises receivers for balancing weights arranged one behind the other and transversely to the longitudinal direction of the rotor, with which receivers, in the gripper closing direction, respective counter elements are associated in a corresponding number on the other gripper unit. Aligned opposing counter elements are therefore associated with each receiver and the selection and application of the selected balancing weight are possible by simple joint displacement of the two gripper units transversely to the longitudinal axis of the rotor without movable components being required for this.

Spot welding and projection welding can be used with a gripper-like device constructed as a welding device which comprises electrodes at both gripper units. Previously MIG and WIG welding were used for aluminium material but, in the meantime, projection welding of pre-shaped compensating sheets is also possible here.

A particularly simple method for applying the balancing weight provides that, in a gripper-like device comprising two gripper units, a plurality of balancing weights are received at preferably the lower gripper unit. These can be displaceably received via a receiver part for the lower gripper unit or, instead, directly on the lower gripper unit such that they can only be moved together therewith.

Counter elements, whose number equals that of the balancing weights, are provided on the upper gripper unit in the application method of balancing weights non-displaceably arranged on the lower gripper unit and the two gripper units are displaced jointly transversely to the longitudinal direction of the rotor and, after placement of the selected balancing weight, the weight and the associated opposing counter element is brought to rest on the periphery of the rotor and fastened.

In the application with displacement of the receiver part, the selected balancing weight is placed on the upper gripper unit opposite a single counter element and fastened. With only one row of balancing weights arranged on the receiver part transversely to the longitudinal direction of the rotor, the receiver part is merely displaced on the lower gripper unit transversely to the longitudinal direction of the rotor, wherein only the application process in one compensation plane is observed.

If the balancing weights are provided in a plurality of rows, located one behind the other in the longitudinal direction of the rotor, in other words in a matrix-like manner on the receiving part at the lower gripper unit, then in an advantageous method the upper gripper unit, which does not carry any balancing weight, is not displaced on placement of the selected balancing weights, in other words is arranged opposite the balancing point. On placement of the selected balancing weight, the receiver part can be displaced transversely to the longitudinal direction of the rotor and in the longitudinal direction of the rotor. It may, however, also be provided that counter elements are arranged at the upper gripper unit in the transverse direction so as to correspond with the number of balancing weights lined up in a row of the lower gripper unit and subsequently a displacement of the receiver part in the longitudinal direction of the rotor on the lower gripper unit and a common displacement of lower and upper gripper unit takes place in the transverse direction. Finally, an arrangement of counter elements at the upper gripper unit in the longitudinal direction of the rotor in a number which corresponds to the number of rows of balancing weights located one behind the other at the lower gripper unit is possible. In this case the joint displacement takes place in the longitudinal direction of the rotor and the displacement of the receiver part of the lower gripper unit in the transverse direction.

It is within the scope of the invention to provide the balancing weights on the upper gripper unit or on the upper and the lower gripper unit.

BRIEF DESCRIPTION OF THE DRAWINGS

The invention will be described in more detail hereinafter with reference to embodiments illustrated in the drawings, in which:

FIG. 1 is a side view of a device for fastening balancing weights,

FIG. 2 is a front view of the device in FIG. 1,

DETAILED DESCRIPTION OF PREFERRED EXAMPLE EMBODIMENTS OF THE INVENTION

Figure 3:
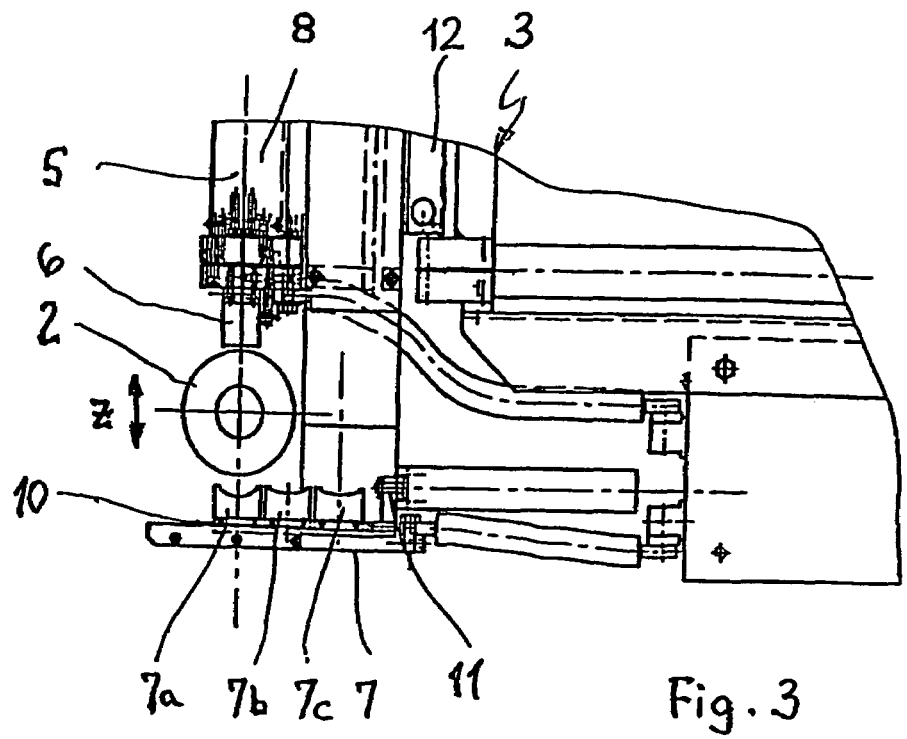
FIG. 3 shows a portion of the device in FIG. 1.

FIG. 1 schematically shows a balancing machine 1 in which a rotor 2 to be balanced is mounted. The balancing machine 1 comprises bearing devices (not shown in greater detail) for the rotor 2 to be balanced, at least one rotary drive, sensors for detecting the rotational behavior of the rotor 2 and of imbalance-induced vibrations and an evaluation device for ascertaining the imbalance of the rotor 2. A device 3 for fastening balancing weights in a plurality of compensation planes of the rotor 2 is also arranged on the balancing machine 1.

In the x direction of a right angle coordinate system, as is symbolized in FIG. 2 by the double arrow x, the device 3 can be displaced on a guide rail 4 arranged on the frame of the balancing machine 1, along the axis of the rotor which, in the illustration of FIG. 2, is located in the plane of the page. The guide rail 4 spans the balancing machine in the longitudinal direction of the rotor and is provided offset at the back, relative to the operator side, from the rotor axis. The device 3 can thus be displaced on the guide rail 4 in various compensation planes and subsequently be arrested.

The device 3 can also be displaced in the y direction, transversely to the rotor axis, as indicated by the double arrow y in FIG. 1, in order to allow mounting of the rotor 2 in the mounting devices of the balancing machine 1, or its removal. For mounting the rotor 2 or its removal, the device 3 is displaced from the operator side toward the offset guide rail 4. To allow fastening of balancing weights, the device 3 is returned in the direction of the rotor axis after mounting of the rotor 2.

The device 3 comprises a gripper-like device 5 with which a balancing weight can be placed in the respective compensation plane, on the external periphery of the rotor 2 and be fastened there. The gripper-like device 5 incorporates, as can be seen in more detail from FIGS. 3 and 4, two gripper units 6, 7, which are mounted in the gripper closing direction indicated by the double arrow z so as to float relative to each other, which, with the aid of an advancing unit 8, can be moved relative to each other for increasing or reducing their spacing.

For fastening the balancing weights, the gripper-like device 5 is arranged with its gripper units 6, 7 on either side of the rotor 2 so as to partially surround it in such a way that the closing direction intersects the rotor axis. The gripper units 6, 7 are jointly movable by means of an advancing unit 8, until one of the gripper units 6, 7 abuts on the periphery of the rotor, in the illustrated embodiment, until the upper gripper unit 6 abuts on the rotor 2. As soon as the upper gripper unit 6 rests on the rotor 2, the lower gripper unit 7 is also brought into contact with the rotor 2 via the counterforce of the advancing unit 8 acting on it. The movement of the lower gripper unit 7 is made possible here by a bearing of the gripper-like device 5, which bearing is floating in a gripper closing direction z on a carrier 12. To compensate for its weight, the gripper-like device 5 is supported here on the carrier 12 via a preferably pneumatic cylinder unit 9. The cylinder unit 9 is loaded with reduced pressure to compensate the weight. It can also be loaded at full pressure to raise the gripper-like device 3, when the rotor is not in place, to the extent that measuring bearing stands provided for mounting the rotor can be overrun in the x direction.

The lower gripper unit 7 is constructed to receive a plurality of balancing weights.

In the embodiment of FIG. 3 three receivers 7a, 7b and 7c are arranged one behind the other transversely to the longitudinal direction of the rotor 2 and can be jointly displaced on the lower gripper unit 7 by means of an actuating device 11. The receivers 7a, 7b, 7c can be provided on the receiver part 10 for joint displacement although the receivers 7a, 7b, 7c can also be displaceable one behind the other in a guide profile. For application of the balancing weight, which is selected for this compensation plane, situated in the receiver 7c and adapted in terms of form to the periphery of the rotor in this compensation plane, the receivers 7a, 7b, 7c are jointly slidingly displaced from the arrangement illustrated in FIG. 3, in which the receiver 7a is aligned with the rotor axis, to the position illustrated in FIG. 1 in which the receiver 7c with the selected balancing weight is aligned with the rotor axis. The gripper-like device 5 is now moved in the closing direction until the upper gripper unit 6 contacts on the rotor 2. The lower gripper unit 7 is then closed, the upper gripper unit 6 being used as a thrust or counter bearing. The balancing weight in the receiver 7c is pressed against the periphery of the rotor and fastened to the rotor 2 by a welding process, the upper and the lower gripper units 6, 7 serving as electrodes. Once the gripper-like device 5 has been opened, the device 3 is moved into the next compensation plane and a further balancing weight is applied there, wherein prior to all application processes, the rotor 2 is rotated into the compensating angle position for this compensation plane, ascertained during the measuring phase. Once balancing weights have been applied in all compensation planes, the device 3 is returned or driven back with the gripper-like device 5 in the direction of the guide rail 4, the rotor 2 is removed and another rotor that has an imbalance is mounted in the balancing machine, the imbalance is determined and the compensation is carried out as described above.

Figure 4:
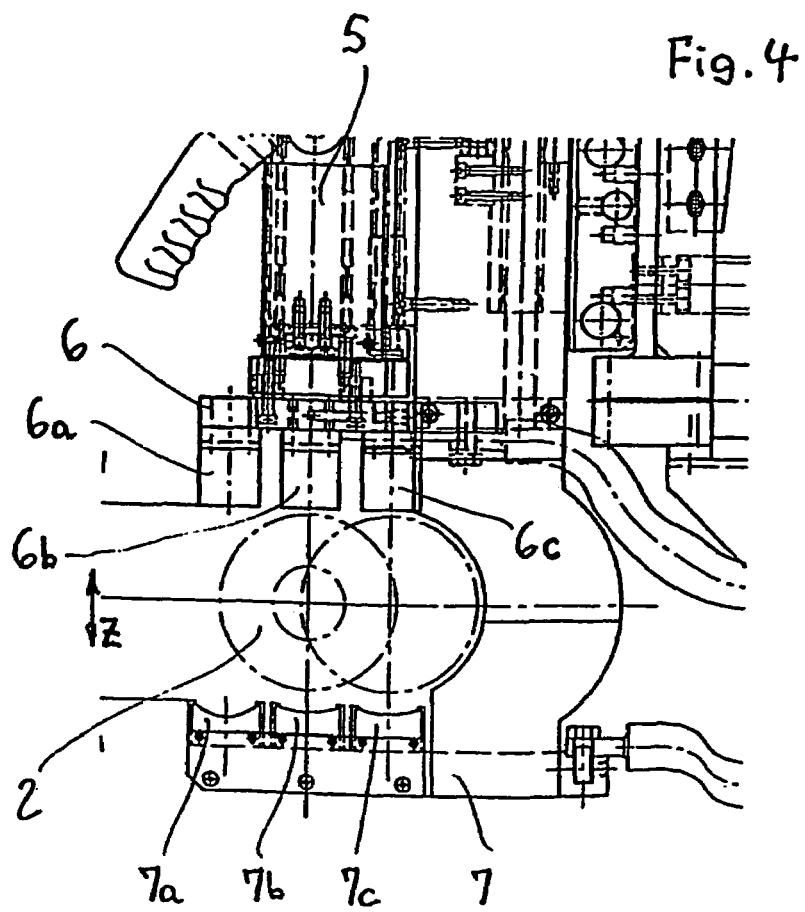
FIG. 4 shows a further embodiment of a portion of the device according to FIG. 1.

In the embodiment of the gripper-like device 5 according to FIG. 4, three receivers 7a, 7b and 7c are arranged on the lower gripper unit 7 which cannot be displaced relative thereto. Three counter elements 6a, 6b and 6c on the upper gripper unit 6 are associated with the three receivers 7a, 7b and 7c on the lower gripper unit 7 so as to be aligned in the gripper closing direction. For application of the balancing weight selected from the three balancing weights for the respective compensation plane, for example of the balancing weight 7a for the rotor section with the smallest diameter illustrated in dot dash lines in FIG. 4, the entire gripper-like device 5 or the lower and upper gripper units 6, 7 with the receivers 7a, 7b, 7c non-displaceably arranged thereon and the counter elements 6a, 6b, 6c are displaced in such a way that the rotor 2 is located with its axis aligned between the upper counter element 6a and the lower receiver 7a. The application or welding process then takes place as described in more detail above.

In the described embodiments, the balancing weights are constructed as balancing metal sheets, of which the shape is adapted to the periphery of the rotor in the respective compensation plane. Once a rotor 2 has been compensated, the gripper-like device 5 is moved to a loading station for equipping of the three receivers 7a, 7b, 7c of the lower gripper unit 7 with balancing metal sheets which are to be used when the rotor is re-balanced. It goes without saying, that, if necessary, more than or fewer than three receivers, located one behind the other, for balancing weights can be provided.

In a modification to the development illustrated in FIG. 3, it can be provided, in a manner not shown in greater detail, that further rows of, for example, three receivers are provided one behind the other in the longitudinal direction of the rotor. This results overall in a matrix-like arrangement of receivers, these expediently being arranged on a receiver part which can be moved on the lower gripper unit. These receivers arranged on the receiver part which can be moved in the direction transverse to the longitudinal axis of the rotor and in the longitudinal direction of the rotor, can thus be equipped with balancing metal sheets such that, for example, rotors with different shapes or different materials can be balanced in mixed operation. For this purpose, the device is initially arranged in the desired compensation plane and then, for example, the receiver part is moved in the longitudinal direction of the rotor in accordance with the type of rotor to be balanced, until the respective row of three receivers of the associated balancing metal sheet is located in the plane in which the counter element of the upper gripper unit is also located. Application of the balancing metal sheets selected from this row of three takes place as described in more detail above with respect to FIG. 3, with displacement of the receiver part on the lower gripper unit.

However, it may also be provided that a number of individual counter elements is provided on the upper gripper unit which corresponds to the number of rows of three on the lower gripper units, so, for application, merely a displacement of the receiver part on the lower gripper unit is required in the transverse direction, irrespective obviously of the movement in the gripper closing direction and the displacement of the device into the respective compensation plane. It is also very easily possible with this configuration to carry out a correcting balance by means of a second supplementary imbalance compensating step which takes place in a compensation plane closely adjacent in the longitudinal direction of the rotor as only one further pair of counter element and row of three is to be selected.

It also goes without saying that, instead of or in addition to the illustrated and described welding device, other known fastening devices, such as gluing devices, may also be used.

It is within the scope of the invention to physically separate the device for fastening balancing weights from the balancing machine if this proves to be advantageous, for example, for a production line. The rotor is then relocated from the balancing machine into the device, wherein information on the ascertained imbalance or compensating data resulting therefrom is passed on.

The invention claimed is:

1. Device for fastening balancing weights to a rotor (2) having a plurality of compensation planes, which comprises at least one gripper-like device (5) which can be positioned along a rotor axis of the rotor, wherein said gripper-like device is adapted to place and fasten a balancing weight characterized in that the gripper-like device (5) comprises a plurality of receivers respectively to receive a plurality of the balancing weights, said plurality of receivers comprising receivers that are arranged one after another in a transverse direction extending transversely to a longitudinal direction of the rotor and that are jointly displaceable in said transverse direction.

2. Device according to claim 1, characterized in that the gripper-like device (5) comprises first and second gripper units (6, 7) mounted so as to float relative to each other in a gripper closing direction, the first and second gripper units being jointly movable until the first gripper unit (6, 7) abuts on the rotor (2), and the second gripper unit (7 or 6) can be placed on the rotor by relative displacement with respect to the first gripper unit (6 or 7).

3. Device according to claim 2, characterized in that the first and second gripper units comprise upper and lower gripper units of which the lower gripper unit (7) carries a receiver part, which carries the receivers and which can be displaced relative to the lower gripper unit and in the transverse direction transversely to the longitudinal direction of the rotor, for receiving the plurality of balancing weights in the receivers.

4. Device according to claim 3, characterized in that the first and second gripper units (6, 7) are jointly displaceable in the longitudinal direction of the rotor.

5. Device according to claim 3, characterized in that the upper gripper unit carries respective counter elements (6a, 6b, 6c) that are respectively associated with the receivers carried by the lower gripper unit.

6. Method for fastening balancing weights to a rotor (2) using a gripper-like device (5) that comprises a plurality of receivers arranged one after another in a transverse direction which extends transversely to a longitudinal direction of the rotor, wherein a plurality of the balancing weights are arranged in said receivers, wherein the receivers carrying the plurality of balancing weights are moved in the transverse direction transversely to the longitudinal direction of the rotor and wherein a selected one of the balancing weights is placed and fastened on a balancing point at a periphery of the rotor.

7. Method according to claim 6, characterized in that two gripper units (6, 7), mounted so as to float in a gripper closing direction, are provided on the gripper-like device (5) and the plurality of the balancing weights can be received in the receivers on a lower one of the gripper units (7).

8. Method according to claim 7, characterized in that the two gripper units (6, 7) are jointly displaced transversely to the longitudinal direction of the rotor for placing the selected one of the balancing weights at the balancing point.

9. Method according to claim 7, characterized in that when placing the selected one of the balancing weights, the receivers for the balancing weights arranged on the lower one of the gripper units (7) are displaced transversely to the longitudinal direction of the rotor.

10. Method according to claim 7, characterized in that for placing the selected one of the balancing weights transversely to the longitudinal direction of the rotor, the one of the gripper units that does not carry the balancing weights, is not displaced.

11. Device according to claim 2, further comprising additional receivers (7a, 7b, 7c) for the balancing weights arranged as a matrix one after another in the transverse direction and in the longitudinal direction of the rotor.

12. Device according to claim 11, characterized in that the receivers are carried on the second gripper unit, and the receivers and the first gripper unit (6) can be displaced relative to each other in the longitudinal direction of the rotor and can both jointly be displaced in the transverse direction.

13. Device according to claim 4, further comprising additional receivers (7a, 7b, 7c) for the balancing weights arranged as a matrix one after another in the transverse direction and in the longitudinal direction of the rotor.

14. Device according to claim 13, characterized in that the receivers are carried on the second gripper unit, and the receivers and the first gripper unit (6) can be displaced relative to each other in the longitudinal direction of the rotor and can both jointly be displaced in the transverse direction.

15. Device according to claim 2, characterized in that the gripper-like device (5) is constructed as a welding device with electrodes at both of the gripper units (6, 7).

16. An apparatus for fastening balancing weights onto a periphery of a rotor, said apparatus comprising:
a first arm;
a counter support surface provided on said first arm;
a second arm arranged displaced from said first arm so as to receive the rotor between said first and second arms; and
a row of receivers arranged one after another in a transverse direction extending transversely relative to a longitudinal direction of the rotor;
wherein said receivers are configured to receive a plurality of the balancing weights respectively, and are jointly movable in said transverse direction so as to move any selected one of the balancing weights into a working position; and
wherein at least one of said arms is movable relatively toward another of said arms so as to engage the rotor between said counter support surface and the selected one of the balancing weights in said working position and so as to fasten the selected one of the balancing weights onto the periphery of the rotor.

* * * * *

UNITED STATES PATENT AND TRADEMARK OFFICE
CERTIFICATE OF CORRECTION

PATENT NO. : 7,249,508 B2 Page 1 of 1
APPLICATION NO. : 10/520390
DATED : July 31, 2007
INVENTOR(S) : Rogalla et al.

It is certified that error appears in the above-identified patent and that said Letters Patent is hereby corrected as shown below:

Column 6,
Line 50, after "weight", insert --on an outer periphery of the rotor (2),--.

Signed and Sealed this

Twenty-fifth Day of November, 2008

JON W. DUDAS
*Director of the United States Patent and Trademark Office*